(No Model.)

J. M. REYNOLDS.
PASSENGER TICKET.

No. 288,594.

Patented Nov. 13, 1883.

Figure 1:
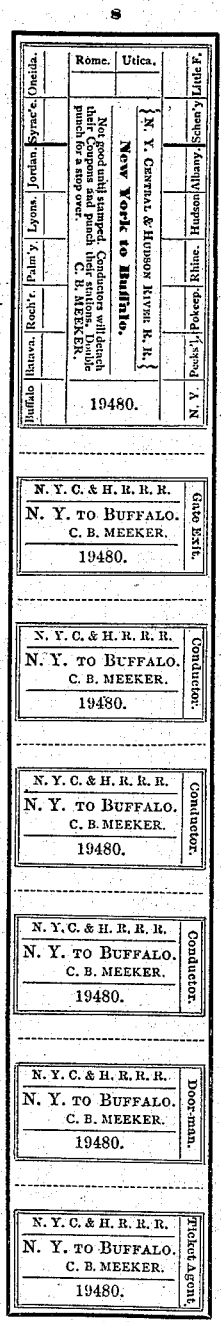

Description of Fig. 1.

Coupon No. 1 is colored Blue.
" " 2 " "
" " 3 " "
" " 4 " White.
" " 5 " Red.
" " 6 " "
Ticket Head 7 " Blue.
" " 8 " White.
" " 9 " Red.

Witnesses:
Fred G. Dieterich
Jno. G. Hinkel

John M. Reynolds
Inventor.
By James H. Mandeville
Attorney.

N. PETERS. Photo-Lithographer, Washington, D. C.

United States Patent Office.

JOHN M. REYNOLDS, OF OSWEGO, NEW YORK, ASSIGNOR TO JAMES H. MANDEVILLE, TRUSTEE, OF WASHINGTON, DISTRICT OF COLUMBIA.

PASSENGER-TICKET.

SPECIFICATION forming part of Letters Patent No. 288,594, dated November 13, 1883.

Application filed June 21, 1883. (No model.)

*To all whom it may concern:*

Be it known that I, JOHN M. REYNOLDS, a citizen of the United States, residing in the city of Oswego, in the State of New York, have invented certain new, useful, and important Improvements upon a Passenger-Ticket, of which the following specification, with its drawings, is a full, clear, and exact description.

The object of this invention is to enable a railway company to control the operations of every officer and employé in or connected with its ticket department, and to secure against spoliation the entire revenue of its passenger traffic, including all moneys paid upon excess baggage. The object here sought is to make ticket swindling and passenger frauds impossible, to abolish the sale of tickets in large blocks upon speculation, to prevent the printing of excess tickets or of tickets and passes not accounted for, and to prevent the use of a ticket more than once.

The invention consists in a passenger-ticket that embraces the following features: first, a ticket-head having on its margin a list of stations from starting-point to destination; second, spaces for each station, in which to indicate the movements of a passenger and his baggage; third, different colors to represent the different divisions or the different railroads covered by the same ticket; fourth, a separate coupon for each railroad employé who handles the ticket, to be by him detached and independently accounted for to a coupon-office at the main offices of a company.

The invention contemplates the use of an extra-baggage coupon divided into two parts, and to be punched whenever the passenger carries an excess quantity of baggage—one part to show the pounds of extra baggage carried, and the other part to show the amount of money paid therefor by the passenger; but to this feature no separate claim is made.

The New York Central and Hudson River Railroad is the one here selected to illustrate this invention. Each of the three divisions of that road is represented by a ticket of different colors. Any ticket from New York to Albany, or intermediate stations, would be printed on a blue blank, from Albany to Syracuse on a white blank, and from Syracuse to Buffalo on a red blank. If a ticket is issued from New York to Syracuse, then the ticket would be blue and white combined, and if issued from New York through to Buffalo, then it would be blue, white, and red combined. The ticket now to be described is a ticket from New York to Buffalo—that is, a local ticket, or a ticket issued by a single railway management.

Figure 2:
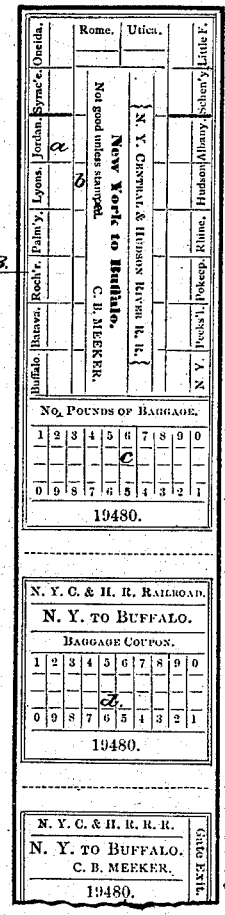

In the drawings, Sheet 1, Figure 1 represents a registered coupon passenger-ticket; and Fig. 2 the same, (its lower part broken off,) with an excess-baggage coupon added.

The ticket-head A, consisting of the portions marked 7, 8, and 9, has attached to it coupons marked 1, 2, 3, 4, 5, and 6, to be detached in order, successively, first, by the ticket or local station agent; second, by the entrance-door man; third, by the conductor of each division, and, fourth, by the exit-gate man. The ticket itself is printed quite the same as those in common use, containing on the ticket-head and coupons the name of the railroad, the usual contract between railroad and passenger, the instructions of the general ticket-agent, and the number of the ticket, the coupons being separable by perforated lines; but where the ticket is for more than one division of the road, then the ticket-head and the coupons, respectively, are printed in more than one color. This enables every one obliged to handle a ticket for the company quickly to see his duty or detect a fraud by inspection merely. It facilitates their redemption at the coupon-office, and prevents any alteration of a ticket by chemical process. On the side margin, B, of the ticket-head are arranged in spaces in successive order the names of stations from selling-point to destination, although figures may be used for this purpose as well as names; and corresponding therewith are spaces *a* and *b*, so arranged as to admit of punching without defacing the printed matter, or without mutilating the smooth external edge of the ticket-head.

The several stages through which a ticket passes will now be given. The passenger buys it. He is bound to pay the ticket-agent its full value. The agent tears off his coupon, and at close of the day, having had to keep no books, and without having to make any reports, remits his cash or certificate of deposit to the coupon-office, with his coupons inclosed as vouchers. He is checked on fares received. The passenger presents his ticket at the entrance-gate, where the gate-man tears off his coupon, thus preventing a passenger from entering the train without a ticket, and at the end of the day he incloses his coupons to the coupon-office. On the first round of the conductor out of New York he detaches the blue coupon immediately on first presentation of the ticket, and punches in the spaces $a$ all the stations on the margin of the ticket-head between New York and Albany, thus compelling a continuous ride over that division and canceling the ticket-head for the distance punched. If the passenger desires to stop off, he must notify the conductor, who then double punches the station where the passenger will stop. On arrival at Albany the conductor reports a stop-off at such station and forwards his coupon to the coupon-office with the package of coupons next transmitted. When the passenger resumes his journey, the next conductor sees that the blue coupon is gone, which at once apprises him of a stop-off. He then puts a third punch in the space $a$, already double punched, to cancel it, and upon arrival at Albany he punches three more holes under Albany to show that the passenger has been carried on his ticket from New York to Albany, although he stopped off at an intermediate station. The conductor from Albany to Syracuse, on first presentation of ticket, detaches the white coupon and at once punches all spaces $a$ for his division, and just before reaching Syracuse he punches three more holes under that station, to evidence that the passenger has been carried clear over another division. The conductor from Syracuse to Buffalo performs a similar duty; but just before reaching Buffalo he tears off and hands to the passenger the exit-gate coupon, which is delivered to the exit-gate man, who returns it at end of the day to the coupon-office. The last conductor who took up the canceled ticket-head returns his coupons to the coupon-office; but he returns the ticket-head to the general ticket-agent, provided the coupon-office is under other than his charge.

The coupon-office is established at the general offices of the company. It is under control of the treasurer or a director. Here all the tickets of a company are printed, registered, and redeemed. Here sets of books are kept, corresponding with all the several classes of tickets issued. The ticket-registry books may be printed in inks of different color corresponding with the color of the tickets; or the same result can be attained by having the printing of a uniform color, but upon paper of different or combined colors. This coupon-office controls all operations of the general ticket-agent and his subordinates, because every ticket is registered before it is delivered to the general ticket-agent to be placed upon sale. After a ticket is sold and used, its complete history is made at the coupon-office from daily returns of coupons made independently by every agent and employé of the company who handles its tickets. It is obvious that without in any degree endangering the interests of the company the general ticket-agent can be placed at the head of the coupon-office, subject to the treasurer or a director, and compelled to check all his operations against himself. The several coupons are checked off in the registry-book in the different columns assigned to the employés who make daily returns to the coupon-office; but this checking or redemption system might be reversed. When the coupons of different colors had been assorted according to number and kind, the check-mark might be made only to show what coupon is wanting. When returned all right and accounts adjusted, the coupons could be destroyed daily, and likewise the ticket-heads, after the general ticket-agent had ascertained that all stop-offs had been correctly reported. Each leaf in the registry-book contemplated for use in connection with this ticket shows the year of issue of the ticket and the terminal stations thereon; again, the railway-divisions covered by the ticket and the names of the conductors for each division; also, the day and date of sale of the ticket, the particular train taken by the passenger, and the hour of its leaving where the passenger entered it. Columns are also arranged in which to show the number of the ticket, and to check off the returns made by the local ticket-agent, the entrance-gate man, by each conductor, and the exit-gate man, the sum paid for extra baggage, and the number of pounds it weighed; also, the return of the ticket-head, and the tickets used for parlor and sleeping cars, as well as the amount of fare paid by the passenger.

Fig. 2 of Sheet 1 shows two coupons for excess baggage, in combination with a passenger-ticket. The coupon C, next to the ticket-head, is returned with it to the general offices of the company, punched so as to show the number of pounds of excess baggage carried for the passenger. It is there audited by the officer who receives the money taken by the station baggage-agent for excess baggage. The other coupon, $d$, punched to show the amount of money paid for excess baggage, is surrendered by the passenger at the end of his journey, where he claims a delivery of his baggage. The agent who receives it sees that the charge is right, or that the passenger did not pay a less sum than he ought to pay, and forwards it to another auditing-officer at the general offices of the company. The baggage-coupons may be attached to each conductor's coupon where a ticket is issued over a connecting railroad. An additional row of punching-spaces, $b$, is provided upon the ticket-head for each station named thereon, to show, when punched, that a stop-over passenger withdrew his baggage from the custody of the company.

What I claim as new, and desire to secure by Letters Patent, is—

1. A registered coupon passenger-ticket having different colors to indicate the separate divisions of the road or the different connecting railroads covered by it, the head A, side margin, B, punching-spaces $a$ and $b$, and the series of detachable coupons 1, 2, 3, 4, 5, and 6, the ticket being adapted to a coupon-register, substantially as set forth.

2. A passenger-ticket bearing a distinguishing mark or number, and provided with coupons detachably connected therewith, bearing a like mark or number, and otherwise designated for appropriation by the local ticket-agent, the gate-man at the selling-station, the several conductors on the line, and the exit-gate man, respectively, whereby the ticket is caused to pass through the hands of numerous employés, whose returns to the central office serve to check and prevent fraud, as and for the purpose set forth.

3. The combination, with a registered passenger-ticket bearing a distinguishing mark or number, and provided with a list of stations from starting-point to destination, with adjoining punching-spaces in which to indicate the stop-off of the passenger or his baggage, of coupons detachably connected therewith, bearing a like mark or number, and designated for appropriation by the local ticket-agent, the gate-men, the several conductors on the line, and the baggage-men, whereby the progress of the passenger and his baggage is traced from starting-point to destination, and the returns of coupons by the several employés check and prevent fraud, as and for the purpose set forth.

4. A registered passenger-ticket bearing a distinguishing mark or number, and provided with coupons detachably connected therewith, bearing a like mark or number, and otherwise designated for appropriation by the local ticket-agent, the entrance-gate man, the several conductors of the line, and the exit-gate man, respectively, the coupons for the different divisions or lines being indicated by a distinguishing color, whereby the coupons may be readily recognized and the returns of the various employés check and prevent fraud.

JOHN M. REYNOLDS. [L. S.]

Witnesses:
BRADLEY B. BURT,
CASSIUS M. BURT,
JOHN R. PADDOCK.